United States Patent [19]

Turner

[11] 4,325,343

[45] Apr. 20, 1982

[54] FUEL METERING SYSTEM

[76] Inventor: William F. Turner, P.O. Box 732, Sanderson, Tex. 79484

[21] Appl. No.: 121,407

[22] Filed: Feb. 14, 1980

[51] Int. Cl.³ ............................................. F02M 21/04
[52] U.S. Cl. ................................. 123/527; 48/180 R; 48/180 P
[58] Field of Search .......... 123/527; 48/180 R, 180 P, 48/180 H, 180 C

[56] References Cited

U.S. PATENT DOCUMENTS

| | | | |
|---|---|---|---|
| 1,954,968 | 4/1934 | Waters | 123/527 |
| 2,073,276 | 3/1937 | Ensign | 123/527 |
| 2,905,543 | 9/1959 | Schreter et al. | 123/527 |
| 3,565,201 | 2/1971 | Petsinger | 123/527 |
| 3,650,254 | 3/1972 | McJones | 123/527 |
| 3,960,126 | 6/1976 | Shinoda | 123/527 |

FOREIGN PATENT DOCUMENTS

8000238 1/1979 Netherlands ......................... 123/527

*Primary Examiner*—Wendell E. Burns
*Attorney, Agent, or Firm*—James C. Fails

[57] ABSTRACT

An improvement in a fuel metering system having an engine, carburetor, a fluid fuel at super atmospheric pressure and a throttle for controlling the speed and power, the improvement being characterized by a fuel pressure regulator and an obstruction and regulator for controlling pressure drop across the obstruction proportional to the pressure drop across the butterfly within the carburetor so as to obtain a substantially constant fuel-air ratio being fed to the engine regardless of the carburetor demand. Also disclosed are a variety of means for accomplishing the obstruction and regulation of pressure drop thereacross, as well as the improved regulators, per se.

11 Claims, 23 Drawing Figures

FUEL METERING SYSTEM

FIELD OF THE INVENTION

This invention relates to a fuel metering system for an engine or the like. More particularly, it relates to an improvement in a fuel metering system having an engine, carburetor, super atmospheric fuel supply and throttle; such as is employed with high pressure gaseous fuels like propane gas.

DESCRIPTION OF THE PRIOR ART

The prior has seen a wide variety of different types of fuel regulating systems for engines. These have ranged from crude methods of feeding solid fuels like coal to externally fired engines such as the Rankine cycle engines, through the conventional carburetor means for vaporizing liquid fuels such as gasoline, to compressed natural gas fuels for constant speed engines. While maintaining a relatively constant fuel-air mixture at a constant demand as for stationary engines pumping natural gas or the like, has been no problem; it has been a problem to provide a relatively constant fuel-air mixture where the load demands vary widely, as in a conventional internal combustion engine on automobiles or the like.

Specifically, where gaseous fuels at super atmospheric pressure; such as, propane, compressed natural gas and the like; have been used in automobiles, no good way has been provided for keeping the fuel-air ratio constant. Consequently, there have been lags in acceleration when the throttle was opened and, conversely, periods of over enrichment when deceleration was experienced.

In fact, governmental agencies have been reluctant to certify fuel metering systems for use with such super atmospheric gaseous fuels because of the unsatisfactory operation of these systems.

SUMMARY OF THE INVENTION

Accordingly, it is an object of this invention to provide an improvement in the fuel metering system for an engine having a carburetor and throttle such that a relatively constant fuel-air ratio mixture is fed to the engine regardless of the load on the engine, as noted by the carburetor demand signal.

It is a specific object of this invention to provide an improvement in the fuel metering system having an engine, carburetor and throttle in which the super atmospheric pressure fluid fuel supply is regulated to provide a constant fuel pressure that is thereafter regulated so as to provide a constant fuel-air ratio as needed for rich or lean operation to optimize power.

These and other objects will become apparent from the descriptive matter hereinafter, particularly when taken in conjunction with the appended drawings.

In accordance with this invention, there is provided an improvement in a fuel metering system having:
a. an engine;
b. a carburetor means for controlling speed and power of the engine;
c. at least one fluid fuel supply at super atmospheric pressure and a fuel supply means and lines for supplying the fuel to the carburetor; and
d. a throttle means having a butterfly means in the carburetor for altering the controlled speed and power obtained by the engine and carburetor;
the improvement comprising:
e. a fuel pressure regulator interposed in the fuel supply lines and responsively connected with the fuel supply lines downstream thereof for regulating the pressure downstream thereof; and
f. first and second means for regulating the flow of the constant pressure fuel so as to maintain a substantially constant fuel-air ratio being fed to the engine regardless of the carburetor demand signals; the first and second means being connected with the fuel supply line downstream of the fuel pressure regulator and upstream of the carburetor; the first and second means being operationally connected so as to sense the position of the butterfly valve means of the throttle means and to sense a differential pressure across the carburetor and being adapted to provide an obstruction to fuel flow and a fuel differential pressure across the obstruction, both proportional to the relative position of the butterfly valve means and the differential pressure thereacross; such that a substantially constant fuel-air ratio is maintained.

DESCRIPTION OF PREFERRED EMBODIMENTS

This invention is useful in any environment in which an internal combustion engine is employed. It is in the field of automobiles, or vehicular apparatus, that internal combustion engines are usually envisioned, and it is, accordingly, in this area of technology that this invention will be described hereinafter in particular.

Figures 1, 2, 3, 4, 5:
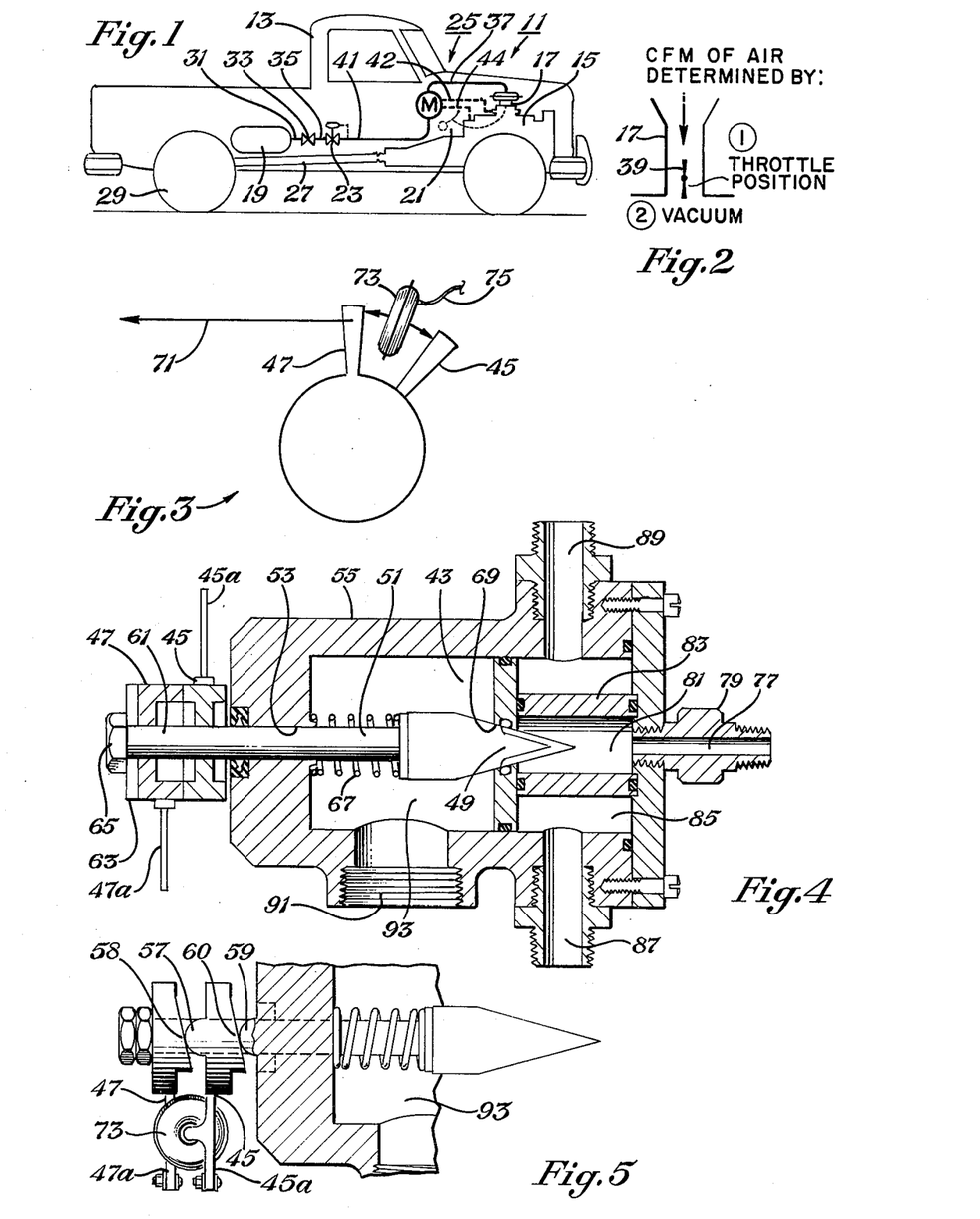
FIG. 1 is a side elevational view, partly schematic, of one embodiment of this invention.
FIG. 2 is a schematic view of the theoretical parameters basic to controlling flow of air and hence the requisite flow of fuel to keep a constant fuel-air mixture.
FIG. 3 is an end view of a pair of lever operated cams and cam followers in accordance with one embodiment of this invention.
FIG. 4 is a cross sectional view of a cam operated valve and differential pressure determining apparatus.
FIG. 5 is a cross sectional view showing the cams of FIG. 4.

Referring to FIG. 1, the apparatus 11 of this invention is employed in a pickup truck 13. The pickup has a conventional engine 15 having a carburetor means 17 for controlling the speed and power of the engine. In most instances, there will be a liquid fuel supply, such as gasoline tank, that is connected to the carburetor to facilitate starting although many times a pressurized gaseous fuel can be employed for starting engines. As illustrated, the fuel supply comprises at least a fluid fuel supply 19 at super atmospheric pressure and a fuel means and lines for supplying the fuel to the carburetor. A throttle means 21 having a butterfly valve means in the carburetor 17 is provided for altering the controlled speed and power obtained by the carburetor responsive to the wishes of an operator, or driver.

The apparatus 11 also includes a fuel pressure regulator 23 interposed in the fuel supply lines and responsively connected downstream for regulating the pressure and creating a constant pressure fuel in the supply line downstream of the fuel pressure regulator 23. The apparatus 11 also includes first and second means 25 for regulating the flow of the constant pressure fuel so as to maintain a substantially constant fuel-air ratio being fed to the engine regardless of the carburetor demand signal. The first and second means 25 are connected to the fuel supply line downstream from the fuel pressure regulator and upstream from the carburetor and operationally connected so as to sense the position of the butterfly valve means of the throttle and sense the differential pressure across the carburetor; and is adapted to provide an obstruction to fuel flow and fuel differential pressure across the obstruction proportional to the position of the butterfly valve means and differential pressure thereacross such that a substantially constant fuel-air ratio is maintained.

As indicated, the pickup truck 13 is representative of any automotive vehicle having the engine and carburetor and throttle means.

The engine 15 may comprise any of the internal combustion engines such as the reciprocating piston engines conventionally employed in automotive vehicles. The apparatus described herein is not readily useable with diesel engines because the injectors that are used to inject the diesel have to be modified to handle readily the compressed gaseous fuel described in this embodiment of this invention. As is recognized, these engines have reciprocating pistons that are connected with a central crank shaft by way of connecting rods. The central crank shaft puts out power as by drive shaft 27 to wheels 29 as by way of a differential and transmission. Suitable ranges and gearing are incorporated into the differential and transmission in accordance with the conventional practice. Other types of engines can be employed if they use carburetors for supplying a fuel-air mixture.

The carburetors 17 may comprise any of the conventional carburetors such as employed with gasoline powered engines. For example it may be a single barrel carburetor, a double barrel carburetor or a four barrel carburetor or even a plurality of separate carburetors. As is recognized, conventional carburetors may have acceleration barrels or separate acceleration carburetors for cutting in at certain speeds. Ordinarily, this invention is easier to understand if a single barrel carburetor is described.

The carburetor ordinarily employs gasoline, although it can employ many types of fuel. In conventional gasoline carburetors, certain jets, such as idling jets and high speed jets, are placed at an appropriate point so as to meter gasoline into the carburetor either under idling conditions or to a venturi type of throat for aspiration by the air passing the opening In the embodiment of this invention, the fuel in the fuel supply means 19 comprises a liquified natural gas such as propane. It could also comprise LPG (liquified petroleum gases) or butane, although the latter have lower vapor pressure in cold weather than desired. On the other hand, of course, it could comprise compressed natural gas if the cylinder were designed to withstand high enough pressure to afford an appreciable range. In any event, the fuel supply lines include high pressure lines 31, high pressure valve 33 and line 35 connected with the pressure regulator 23. Suitable low pressure delivery line 37 is employed to deliver the fuel into the top of the air filter immediately above the carburetor.

The throttle means 21 comprises an accelerator peddle that is hingedly mounted for pivotal movement responsive to the foot of the operator and connecting means such as linkages, links, cables or the like that are connected with the butterfly in the carburetor. As can be seen in FIG. 2, the butterfly 39 in the carburetor 19 essentially controls the cubic feet per minute (CFM) of air that flows there past into the engine. This in turn aspirates the fuel from suitable fuel openings in a conventional engine. Expressed otherwise, the cubic feet per minute of air that flows into a given engine through a given carburetor is determined by two things: 1. the throttle position and 2. pressure drop across the carburetor or as is commonly termed the "vacuum" being drawn to the engine. If the fuel-air ratio is to be maintained constant in the mixture to maintain most efficient combustion, the fuel must similarly vary in the amount that is fed to the engine as the air varies.

To effect this result, this invention provides the pressure regulator 23 for creating constant pressure fuel in the line 41. For example, the pressure may be controlled at an intermediate pressure sufficient to give a pressure drop across an obstruction proportional to pressure drop across the carburetor and may be stepped down from some propane pressure; for example, propane pressurized from 150 to 200 PSIG (pounds per square inch gauge). Any of the conventional air pressure regulators that have been used, for example in the welding art, may be employed herein as long as it gives good control of the constant pressure fuel in the line 41.

The first and second means 25 are connected, as indicated by dashed lines 42 and 44 with the butterfly 39 and with the intake manifold of the engine 15. This allows the first and second means 25 to sense the butterfly position and differential pressure across the carburetor assuming substantially the atmospheric pressure at the inlet of the carburetor.

In the embodiment of FIGS. 3–5, first and second means for regulating the flow of constant pressure fuel comprises lever operated cams and cam followers to control the opening past a poppet flow obstruction. Specifically, the first and second means 25 includes a valve means 43, FIG. 4 and at least two discs and levers 45, 47 that are connected respectively with the throttle means and differential pressure across the carburetor to effect opening and closing of the valve means for maintaining substantially constant fuel-air admixture.

The valve means 43 includes a poppet 49 that is mounted by way of a longitudinally movable shaft 51. The shaft 51 moves longitudinally of its passageway 53 in the body 55 responsive to relative movement of the respective cams and cam followers 57, 58 and 59, 60, FIG. 5. The discs and levers may comprise separate discs with attached levers, illustrated by the levers 45a and 47a, or they may comprise integrally formed discs and levers. In any event, the discs are rotatably connected with the shaft 51 and held by suitable washers and nut 63, 65 so as to move shaft 51 longitudinally responsive to their being rotated. A spring 67 provides the biasing to seat the poppet 49 against its seat 69 when allowed to move there by way of the respective cams and cam followers 57–60. The first disc and lever 47, FIG. 3, is connected, by way of the cable 71, with the throttle 39 so as to be moved as the throttle 39 is moved. This effects a primary raising and lowering of the poppet 49 with respect to its seat 69. The second disc and lever 45 is connected by a vacuum dash pot 73 and line 75 with the intake manifold of the engine 15 for moving the second disc and lever 45 responsive to the engine vacuum. This affords a secondary movement impressed onto the primary movement of the first disc and lever 47. The combination of these movements effects proper positioning of the poppet with respect to its seat 69 to provide the proper flow of propane to maintain the fuel-air mixture constant. Specifically, the propane is supplied by way of the passageway 77, FIG. 4 through fitting 79 which represents the propane line coming in, such as line 41, FIG. 1. An inlet fuel passageway 81 is provided by way of the cylinder 83 that is sealingly connected in the chamber 85. The chamber 85 is connected with hot water inlet passageway 87 and hot water outlet passageway 89 for flowing hot water around the propane in the passageway 81 to insure that it has completely vaporized to form a gaseous fuel. If the fuel is already gaseous, this chamber may not be necessary. A fuel effluent passageway 91, having a threaded connection for connection of the line such as line 37, allows passage of the gaseous fuel from its chamber 93 to the carburetor.

In operation, the apparatus 11 is connected as illustrated and described hereinbefore. Specifically, the propane in propane tank 19 is connected with the propane regulator 23 which forms a constant pressure propane in line 41. Thereafter, the engine is started and fuel allowed to flow to the engine, as by a conventional electric solenoid valve (not shown). Specifically, the disc and lever 47 is connected to be moved responsive to the butterfly 39 of the throttle means 21 to open the poppet 49 from its seat 69 and allow propane gas to flow to the engine. Thereafter, the combination of discs and levers 47 and 45 react to butterfly position and pressure drop across the carburetor, as signaled by the intake pressure at the intake manifold of the engine 15, to maintain a constant fuel-air ratio regardless of demand signal to the engine. Specifically, the first lever 47 may be pulled by the throttle to open up the poppet by moving the cam follower 58 upwardly along the cam 57. Thereafter, the manifold pressure is sensed by the vacuum dash pot 73 moves the second lever 45 to augment or diminish flow to maintain the fuel-air ratio substantially constant in the mixture being fed to the engine.

Figure 6:
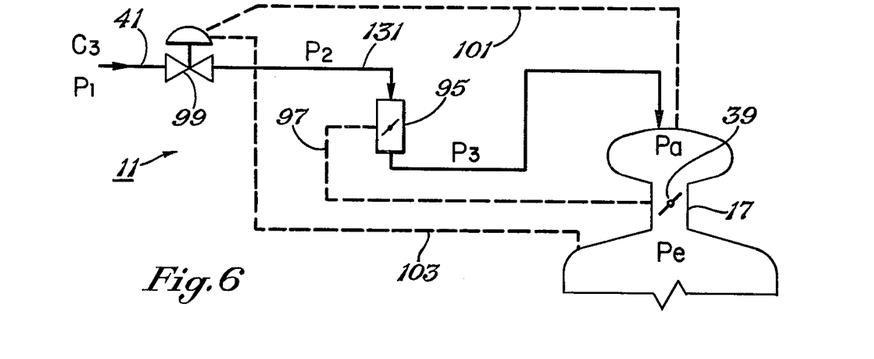
FIG. 6 is a schematic view of another embodiment of this invention.

FIG. 6 illustrates schematically a fuel metering system 11 in which the first and second means for regulating the flow of the fuel includes a valve means for providing the obstruction and a second fuel pressure regulating means for regulating fuel pressure immediately upstream of the valve means so as to provide a differential pressure across the valve means proportional to the differential pressure across the carburetor. Specifically, the valve means comprises a second butterfly valve 95 analogous to the first butterfly in the carburetor. The second butterfly valve 95 is responsively connected with the first butterfly valve, directly or indirectly through the throttle means, so as to be proportionally similarly positioned. The interconnection is shown by dashed line 97. The dashed line 97 may represent either a mechanical interconnection or an electronic positioning interconnection. The second fuel regulator means comprises a fuel pressure regulator 99 that is connected with the air pressure upstream of the carburetor, as shown by dashed line 101 showing interconnection with Pa; and is connected with the engine manifold pressure downstream of the carburetor, as shown by the dashed line 103 connected with the pressure Pe. This causes the fuel pressure regulator 99 to control the pressure upstream of the butterfly valve 95, the pressure being designated as $P_2$ at a lower pressure than the propane ($C_3$) pressure $P_1$ such that there is a differential pressure across the second butterfly valve 95 proportional to the first differential pressure across the carburetor.

Figures 7, 8, 9:
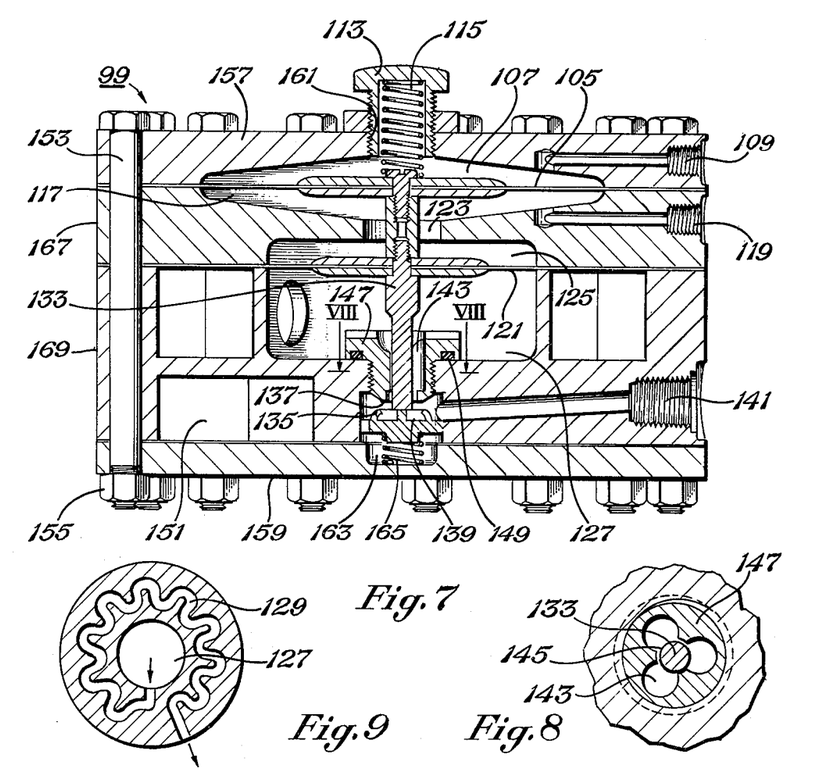
FIG. 7 is a cross sectional view of a pressure regulator of FIG. 6.
FIG. 8 is a partial cross sectional view taken along the lines VIII—VIII of FIG. 7.
FIG. 9 is a schematic cross sectional view taken through the body of the regulator of FIG. 7., showing the tortuous passageway for the insuring a gaseous fuel at the effluent end.

Referring to FIGS. 7–9, the fuel pressure regulator 99 is illustrated in respective sectional views. The fuel pressure regulator 99 includes a diaphram 105 sealingly enclosed within chamber 107 and connected by passageway 109 to the atmospheric pressure at the top of the carburetor, as indicated by line 101 in FIG. 6. An adjusting screw, 113 and balance spring 115 are provided for obtaining the desired setting after suitable calibration in accordance with conventional techniques. The diaphram 105 has a first area that is exposed to the pressure in passageway 109; for example, substantially atmospheric at the top of the carburetor. The bottom side of the diaphram 105 is exposed to the pressure in chamber 117 which is the pressure in passageway 119 that is connected to the manifold of the engine to monitor engine vacuum. The fuel pressure regulator 99 includes a second diaphram 121 that has a second area smaller than the first area of the first diaphram 105. The second diaphram is exposed to the pressure in chamber 117 which extends downwardly through passageway 123 into the chamber 125. On its other side, the second diaphram 121 is exposed to the pressure $P_2$ in the chamber 127. As can be seen in FIG. 9 the fuel will flow from the chamber 127 into the tortuous passageway 129. The tortuous passageway 129 insures that the fuel is a gas. If it is a liquid, it is vaporized before it is vented to the line 131, FIG. 6 for passage to the butterfly valve 95. Thus the respective first and second diaphrams 105 and 121 move upwardly to move the valve stem 133 upwardly and force the valve poppet 133 against the valve seat 137 to close off flow when pressure becomes too high.

The valve poppet 135 includes a resilient seal 139, such as formed of Neoprene or the like, that will seal against the seat 137 and block flow of the gaseous fuel. The gaseous fuel flows inwardly through fuel inlet passageway 141 when flow is allowed. As indicated, the respective passageways 109, 119 and 141 have threaded interconnections for receiving appropriately threaded fittings, such as bushings for interconnection with fuel lines as appropriate. When the valve poppet 135 is moved off of the seat 139 by downward movement of the center of the diaphrams and the valve stem 133, the fuel flows from the inlet passageway 141 upwardly through the throat passageway 143. The throat passageway 143, FIG. 8, comprises a plurality of separate passageways around the valve stem 133 as well as clearance 145 to allow free movement of the valve stem 133. An insert 147 is sealingly screwed in place. Resilient seals 149 are provided.

A water passageway 151 comprises a tortuous passageway similar to passageway 129 for passing hot water through the valve of the voltage regulator to insure that the fuel is vaporized. Water passageway 151 extends from about 30° on either side of the fuel inlet passageway around through the body of the regulator 99.

The body of the regulator 99, as illustrated, is comprised of a plurality of prepared plates held together by suitable bolts 153 and nuts 155. The top and bottom plates 157 and 159 are relatively simple plates that have respective apertures for receiving the bolts. The top plate 159 includes the passageway 101 and the threaded aperture 161 for receiving the adjusting screw 113. The bottom plate 159 has a recess 163 milled thereinto for receiving the spring 165 to assist in moving the poppet 136 against the seat 137. It is understood that the respective top and bottom connotations are given with respect to FIG. 7 and not with respect to a particular way of mounting the fuel pressure regulator 99 which can be mounted in any position. The top intermediate layer 167 has the respective chambers and passageways formed thereto, as by casting, drilling, milling, and the like. Preferably, they are cast. The bottom intermediate layer 169 similarly has the respective apertures and passageways cast and drilled thereinto for insertion of the respective valve stem and valve poppet 133, 135; as well as inserts 147 and the respective fittings for the fuel in the passageway 141. Respective diaphrams 105 and 121 are held in place intermediate respective layers of the body of the regulator 99.

In operation, the embodiment of FIGS. 6–9 is as follows. The fuel at pressure $P_1$; for example, propane at about 200 PSI; is sent to the regulator 99 through the line 41. The engine is started. It can be started on the conventional fuel and switched over to the auxiliary fuel; an appropriate solenoid can be opened so as to allow the fuel (gaseous fuel) to pass to the engine for starting; or the regulator can be employed to automatically pass the gaseous fuel to the engine at appropriate cranking vacuum; for example, about one inch of mercury vacuum.

With the engine running, the pressure regulator 99 senses the pressure upstream and downstream of the carburetor 17, FIG. 6. Thus it regulates the downstream pressure $P_2$ such that the pressure drop $P_2 - P_3$ is proportional to the pressure drop $Pa - Pe$. As described hereinbefore, the butterfly valve 95 is positioned in a similar angle as the butterfly valve 39 in the carburetor 17. Thus, it can be seen that the respective butterfly valves 95 and 39 are similarly positioned and the pressure drop across each is maintained proportional so that the fuel-air mixture is maintained substantially constant regardless of the position of the butterfly 39 in the carburetor 17.

Figure 11:
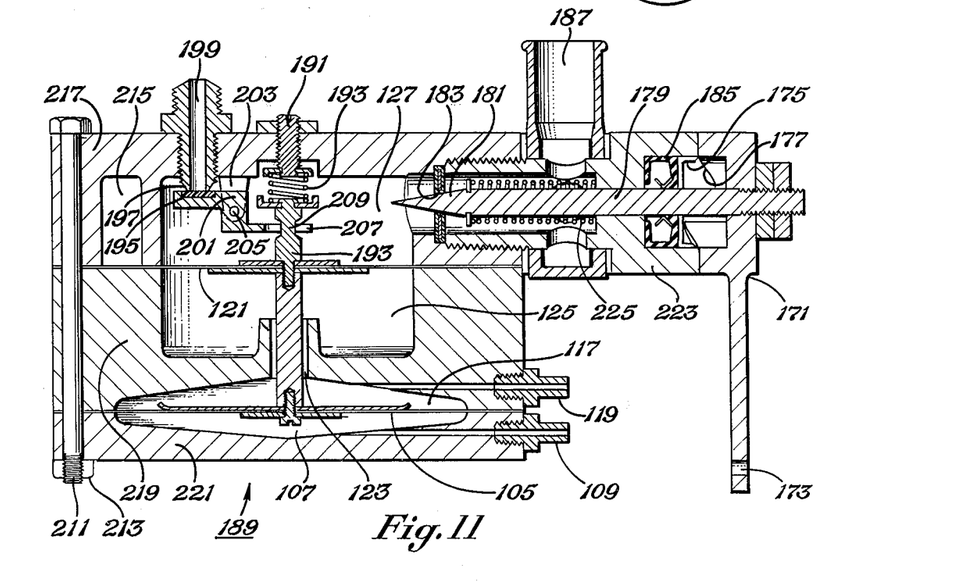
FIG. 11 is a cross sectional view of a cam operated valve employed in conjunction with a differential pressure regulator.

Referring to FIG. 11, there is illustrated a combination of the cam lever operated valve means and the fuel pressure regulating means. Specifically, a cam disc and lever 171 has the outer end 173 of the lever connected with the throttle means so as to move responsive to movement of the throttle means. Respective cams and cam followers 175, 177 move the shaft 179 longitudinally thereof to move a poppet 181 off a seat 183 to allow flow of fuel. Suitable sealing means 185 are employed to prevent leakage about the shaft 179. Effluent passageway 187 allows fuel to pass to the engine; for example, at the top of the carburetor as illustrated hereinbefore. The fuel pressure regulator portion 189 includes a diaphram 105 sealingly enclosed within a chamber 107 and connected by passageway 109 to atmospheric pressure at the top of the carburetor, as indicated by line 101 in FIG. 6. An adjusting screw 191 and spring 193 are provided for obtaining the desired setting after suitable calibration in accordance with the conventional techniques. The diaphram 105 has a first area that is exposed to the pressure in passageway 109; for example, substantially atmospheric at the top of the carburetor. The other side of the diaphram 105 is exposed to the pressure in chamber 117 which is the pressure in passageway 119 that is connected to the manifold of the engine to monitor engine vacuum. Fuel pressure regulator 189 includes a second diaphram 121 that has a second area smaller than the first area of the first diaphram 105. The ratio of the first and second areas of the diaphram 105 and 121 may be 1:2 or such other ratio as determined to be desirable by design criteria. The second diaphram is exposed to the pressure in chamber 117 which extends downwardly through passageway 123 into the chamber 125. On its other side, the second diaphram 121 is exposed to the pressure $P_2$ in the chamber 127. The first and second diaphrams 105 and 121 are connected with the valve stem 193. A poppet 195 sealingly seats against the seat 197 on the fuel inlet passageway 199. A carrying member 201 is pivotally mounted on bracket 203 by shaft 205. The other end 207 of the member 201 is bifurcated to allow some movement of the recessed portion 209 of the shaft 193 without movement of the poppet 195. When the movements become large enough, however, the poppet 195 is pivoted upwardly to allow the fuel to flow through fuel inlet passageway 199 and pressurize the chamber 127. The obstruction to flow is controlled by the opening between poppet 181 and the seat 183 operated by the shaft 179 responsive to movement of the disc-lever 171 connected with the throttle means.

The regulator is held together by bolts 211 (and nuts 213) through suitable apertures that do not communicate with the interior chambers.

A tortuous passageway 215 is provided for flow of hot water to insure vaporization of fuel.

The body of the regulator 189, as illustrated, is comprised of a plurality of prepared plates including the top plate 217, intermediate plate 219 and bottom plate 221. The relative positions of top and bottom are used herein with respect to FIG. 11 rather than to the position in which the regulator 189 may be mounted, since it can be mounted in substantially any position and function properly. As described hereinbefore with respect to FIG. 7, the respective plates are suitably cast, drilled, and machined to form the chambers and passageways. The seat 183 is held in its threaded passageway by way of a threaded insert 223 that carries the cams 175 and the seals 185. A biasing spring 225 is provided for moving the shaft 179 so as to seat the poppet 181.

The operation of the embodiment of FIG. 11 is similar to that of FIGS. 6–9. Specifically, the fuel at pressure P₁; for example, propane are about 200 PSI; is sent to the regulator 189 through line 41. The engine is started as described hereinbefore. With the engine running, the regulator 189 senses the pressure upstream and downstream of the carburetor 17, FIG. 6. Thus it regulates the downstream pressure $P_2$ in the chamber 127 such that the pressure drop $P_2 - P_3$ is proportional to the pressure drop $P_a - P_e$. As described hereinbefore, the cam lever 171 moves the poppet 181 with respect to its seat 183 to provide an obstruction to flow proportional to the position of the butterfly 39 and the carburetor 17. Thus it can be seen that the fuel is then allowed to flow to admix with the air at a substantially constant ratio regardless of the position of the butterfly valve 39 and the carburetor 17.

Figure 10A:
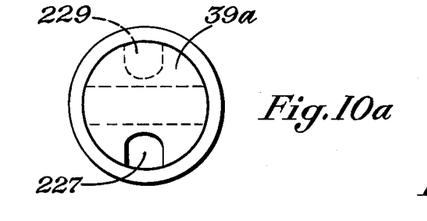
FIG. 10a is a top view of a butterfly valve for use with a two barrel carburetor.
Figure 10B:
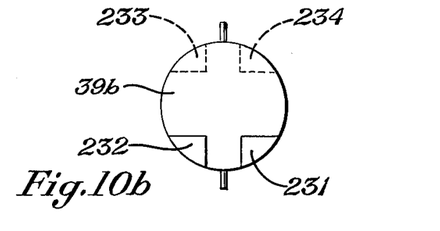
FIG. 10b is a top view of a butterfly valve for use with a four barrel carburetor.
Figures 10C, 10F:
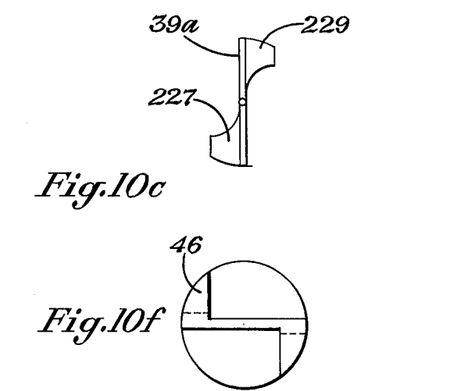
FIG. 10c is a side elevational view of a butterfly of FIG. 10b in the wide open position.
FIGS. 10e and 10f are respective isometric and top views of the butterfly valve for still another butterfly in accordance with this invention.
Figure 10D:
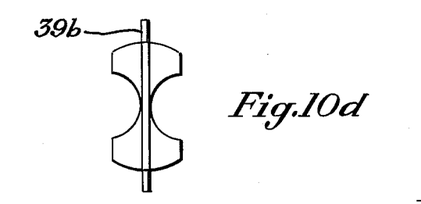
FIG. 10d is a side elevational view of another embodiment of the butterfly valve for use with a multiple barrel carburetor.
Figure 10E:
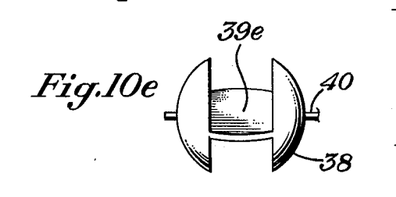
Figure 10G:
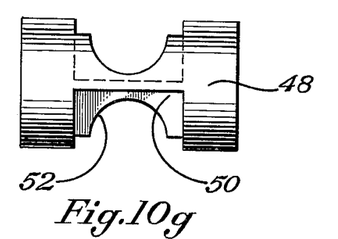
FIGS. 10g and 10h are respective side elevational view and isometric view of another type of butterfly for use with multiple barrel carburetors in accordance with this invention.
Figure 10H:
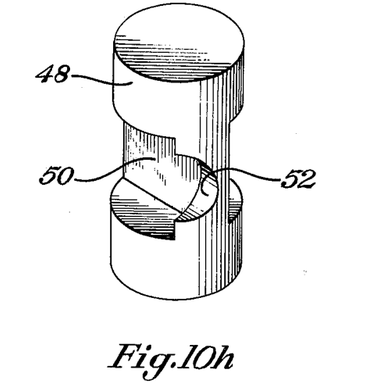

Refinements in the foregoing designs are possible for improved engine operation with different carburetors or the like. For example, in FIG. 10a there is illustrated a top view in which the butterfly 39a has lobes 227, 229 thereon. This is illustrated also in FIG. 10c where the butterfly 39a is in the wide open position with the lobes 227 and 229 obstructing flow. This type butterfly is employed with a two barrel carburetor. For use with a four barrel carburetor, the butterfly 39b, FIGS. 10b and 10d have respective lobes 231–234. With the butterfly wide open, a profile such as presented in FIG. 10c would be presented. On the other hand, if desired, a profile such as illustrated in FIG. 10d could be employed if the respective lobes are on both sides of the butterfly 39b. This type of construction is employed with a four barrel carburetor. If desired, a partial cylinder such as illustrated in FIGS. 10e, 10f, 10g, and 10h could be employed to simulate restriction of fuel proportional to the restriction of the butterflys in multiple barrel carburetors, multiple carburetors, or the like. Specifically, a butterfly 30e, FIG. 10e, may have solid, arcuate pieces of metal 38 affixed at the shaft 40. On the other hand, the pieces may be abbreviated as shown by pieces 46, FIG. 10f. The modified cylinder arrangement of FIGS. 10g and 10h employ a cylinder 48 that has a flat milled section 50 and an arcuate section 52, the latter opening first as a single barrel of a carburetor opens first.

Figure 12:
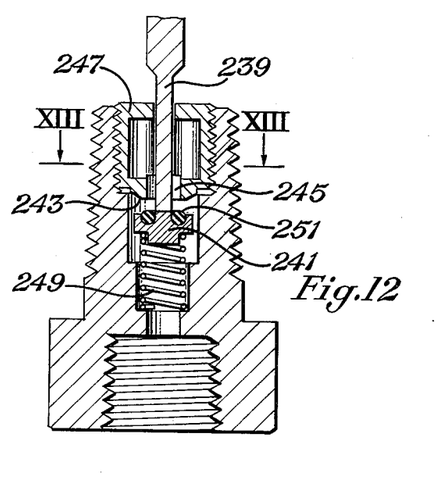
FIG. 12 is a cross sectional view of a valve seat and valve stem guide for the regulator of FIG. 11.
Figure 13:
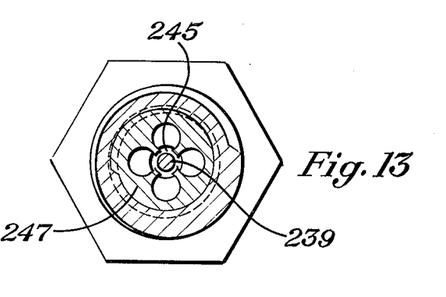
FIG. 13 is a plan view, partly in section, taken along the lines XIII—XIII of FIG. 12.
Figure 14A:
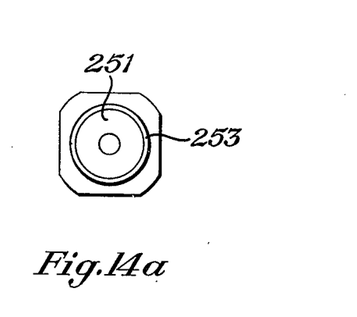
FIGS. 14a and 14b are respective end and side views of a valve poppett for use in FIG. 12.
Figure 14B:
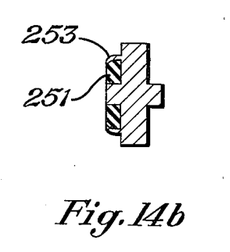

FIG. 12 is a cross sectional view showing an improved valve stem 239 for pulling a poppet 241 into sealing engagement with a seat 243. As can be seen in FIG. 13, a clearance 245 is provided between the shaft 239 and the insert 247. A biasing spring 249 assists in positioning the poppet 241. The poppet has a resilient seal 251. As illustrated in FIGS. 14a and 14b, the resilient seal 251 is preferably enclosed within a metallic ring 253.

If, on the other hand, the poppets for the respective obstructions to fuel flow, such as poppet 181, FIG. 11 or poppet 49, FIG. 4, are employed, the needle valve can be stepped to conform to secondary barrels of multiple barrel carburetors.

Figure 15:
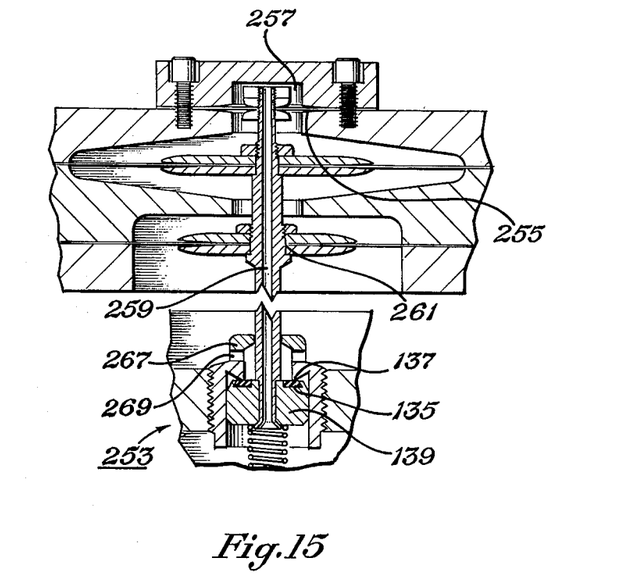
FIG. 15 is a partial cross-sectional view of an automatic calibration feature useful in this invention.

Referring to FIG. 15, there is illustrated an automatic calibration means 253. This invention has been found to operate more satisfactorily in a wide range of temperatures with the automatic calibration means 253 than having to adjust the adjusting screw 113, FIG. 7, each time there is significant change in temperature or fuel pressure.

Specifically, it has been found that the ambient temperature can cause propane vapor pressure variation of from 200 psig at high temperature to as low as 20 psig at low temperature. The pressure variation on the poppet of the pressure regulator, FIG. 7, causes minor performance differences. The automatic calibration means thus comprises a means for neutralizing the effects of variations in pressure of the fuel; for example, lowered vapor pressure in the case of propane or the like or lowered container pressure in the case of compressed natural gas or the like. The adjusting screw is replaced by a diaphram 255 in chamber 257 communicating with upstream pressure of the fuel. As illustrated, the communication is by way of passageway 259 interiorly of stem 261. The area of the diaphram 255 is slightly less than that of the valve poppet seating against the seat, thus preventing inadvertant opening by pressure surges. The ratio of the area of the diaphram to the area of the poppet may be from 0.8 to 0.95; for example, about 0.94. It is immaterial from a performance viewpoint whether the diaphram and chamber are at the top or bottom of the pressure regulator. From a safety point of view, it is preferred to place them at the top so any leak is into the carburetor.

There are other kinds of apparatus that can be employed as the means for neutralizing the variations in pressure of the fuel, whether below or above the valve poppet and seat. For examples, a sliding piston and o-rings could be employed in the chamber, as could a sliding rod. If desired, a bellows can be employed as the means for neutralizing the variations in fuel pressure.

It is noteworthy in FIG. 15 that the insert 267 has laterally extending passageways 269 for splaying the incoming fuel onto the hot metal body of the regulator, instead of onto the diaphragm.

While the respective approaches have been shown mechanically and employing pneumatic type instrumentation for sensing the pressure, the same results can be done electronically. If the electronic method and/or apparatus is employed, the predetermined valve position can be effected and a pressure proportional to the vacuum pressure of the engine can be employed upstream of the valve. Moreover, an electronic sensor can be emplaced in the exhaust of the engine to monitor the carbon monoxide content or other such variable as desired to optimize the settings for the respective elements. The various mechanical and electronic settings can be made on an empirical basis to optimize the response of the engine.

The following example illustrates one application of this invention. A large goose-neck trailer being pulled by a one ton pickup would normally run at speeds of from 85 to 90 miles per hour wide open on the engine with conventional fuel. A commercial unit to convert to use of propane type fuel was installed and resulted in a 10 to 15 mile per hour loss in top speed. Expressed otherwise, the maximum speed that the one ton pickup would pull the large goose-neck trailer was 75 miles per hour on the commercially available propane conversion unit. The conventional unit was removed and the embodiment described herein in which the fuel-air ratio was maintained substantially constant was installed. It was found that the original top speed of 85 to 90 miles per hour could be obtained in performance.

In the embodiment described, the adjusting screw 113, FIG. 7, was set so that the valve remained closed until the engine was rotating and maintaining a one inch of mercury vacuum before flow of fuel was allowed.

In this invention, a push button primer can be employed to start the engine. Also, a capillary can be emplaced in the line 103, FIG. 6, to provide an enriching action during periods of acceleration.

The differential pressure drop across the carburetor may range from 0 to 28 inches of mercury (Hg.) vacuum. The differential pressure across the second butterfly valve 95 may range from 0 to 15 pounds per square inch.

Whereas the use of a valve having cams to simulate butterfly action was described hereinbefore, the same result can be obtained with the comparable multiple barrels and butterflies with the respective barrels set to open in proportion that the butterflies in the respective barrels of the carburetor open.

From the foregoing, it can be seen that a wide variety of respective sub elements of this invention can be combined to obtain the same result. For example, there are at least six different combinations.

1. The first combination is to use double disc-lever-cam-cam follower arrangement in combination with a needle valve for regulating the obstruction and the pressure drop proportional to the carburetor valve position and pressure drop.
2. The double disc-lever-cam-cam follower can be employed in combination with a butterfly valve to obtain the proportionate flow of fuel to maintain fuel-air ratio substantially constant.
3. A differential pressure regulator can be employed in conjunction with a needle valve.
4. The differential pressure can be employed in conjunction with a butterfly valve.
5. The differential pressure can be controlled by the sensing of the pressure and the butterfly position positioned mechanically, as by the direct interlink. This has been found to be the preferred embodiment tested thus far.
6. Electronic controls can be employed to obtain the desired result as described hereinbefore.

From the foregoing, it can be seen that this invention achieves the objects delineated hereinbefore and alleviates difficulties with the prior art systems that have not been heretofore alleviated.

Although the invention has been described with a certain degree of particularity, it is understood that the present disclosure is made only by way of example and that numerous changes in the details of construction and the combination and arrangement of parts may be restored to without departing from the spirit and the scope of the invention, reference for the latter purpose being had to the appended claims.

I claim:
1. In a fuel metering system having:
 a. an engine;
 b. a carburetor means for controlling speed and power of said engine;
 c. at least one fluid fuel supply at super atmospheric pressure and a fuel supply means and lines for supplying fuel to said carburetor; and,
 d. a throttle means having a butterfly valve means in said carburetor for altering the controlled speed and power attained by said carburetor; the improvement comprising:
 e. a fuel pressure regulator interposed in said fuel supply lines and responsively connected with said fuel supply line downstream thereof for regulating the pressure in creating a constant pressure fuel in said supply line downstream of said fuel pressure regulator;
 f. first and second means for regulating the flow of said constant pressure fuel so as to maintain a substantially constant fuel-air ratio being fed to said engine regardless of the carburetor demand signal; said first and second means being connected with said fuel supply line downstream from said fuel pressure regulator and upstream of said carburetor; said first and second means being operationally connected so as to sense the position of said butterfly valve means of said throttle means and a differential pressure across said carburetor and adapted to provide an obstruction to fuel flow and fuel differential pressure across the obstruction proportional to the relative position of the butterfly valve means and the differential pressure thereacross; such that a substantially constant fuel-air ratio is maintained.

2. The fuel metering system of claim 1 wherein said first and second means for regulating the flow of said fuel includes a valve means for providing said obstruction and a second fuel pressure regulating means for regulating the fuel pressure immediately upstream of said valve means so as to provide a differential pressure across said valve means proportional to said differential pressure across said carburetor.

3. The fuel metering system of claim 2 wherein said valve means comprises a second butterfly valve analogous to said first butterfly valve in said carburetor, said second butterfly valve being responsively connected with said first butterfly valve and proportionally similarly positioned; and said second fuel regulator means is a fuel pressure regulator connected with air pressure upstream of said carburetor and with engine manifold pressure downstream of said carburetor for maintaining the second differential pressure across said second butterfly valve proportional to the first differential pressure across said carburetor.

4. The fuel metering system of claim 3 wherein fuel is fed upstream of said carburetor to admix with the air thereto.

5. The fuel metering system of claim 3 wherein a capillary restriction is interposed within the connection between said fuel pressure regulator and said manifold pressure to serve for maintaining a relatively rich mixture to facilitate acceleration.

6. The fuel metering system of claim 3 wherein said second butterfly valve has a plurality of lobes on its butterfly to simulate differential pressure similar to a multiple barrel carburetor.

7. The fuel metering system of claim 3 wherein said second fuel pressure regulator means includes a first diaphram sealingly enclosed within a chamber and connected on its respective sides with the pressure upstream of said carburetor and with manifold pressure downstream of said carburetor and having a first area; includes a second diaphram having a second area being connected with said manifold pressure and with the fuel pressure upstream of said second butterfly valve; and includes a valve means responsively connected with said first and second said diaphrams and operationally interposed in said fuel flow path so as to control flow of said fuel from zero to maximum for maintaining the second differential pressure across said second butterfly valve proportional to said first differential pressure across said first butterfly valve.

8. The fuel metering system of claim 2 wherein said valve means comprises a valve that is connected with and operationally opened and closed by a cam and cam follower connected to a lever that is responsively connected with said throttle means and a regulator that includes a first diaphram sealingly enclosed within a chamber and connected on respective sides with the pressure upstream of said carburetor and with manifold pressure downstream of said carburetor and having a first area; includes a second diaphram having a second area being connected with said manifold pressure and with the fuel pressure upstream of said second butterfly valve; and includes a valve means responsively connected with said first and second said diaphrams and operationally interposed in said fuel flow path so as to control flow of said fuel from zero to maximum for maintaining the second differential pressure across said second butterfly valve proportional to said first differential pressure across said first butterfly valve.

9. The fuel metering system of claim 1 wherein said first and second means for regulating the flow of said fuel includes a valve means and at least two discs and levers that are connected respectively with said throttle means and the differential pressure across said carburetor to effect opening and closing of said valve means for maintaining a substantially constant fuel-air admixture.

10. The fuel metering system of claim 9 wherein said valve means includes a seat and a poppet, said poppet is connected with said two discs and respective levers; said discs include respective two cams and cam followers for effecting movement of said poppet responsive to movement of said levers, such that said poppet is moved toward and away from said seat as necessary to maintain said substantially constant fuel-air ratio.

11. The fuel metering system of claim 10 wherein a first said lever is connected with said throttle means and a second said lever is connected with a diaphram responsively connected with the first differential pressure across said carburetor, said diaphram being responsively connected also with said first lever for master control.

* * * * *